United States Patent [19]
Shin

[11] Patent Number: 6,088,243
[45] Date of Patent: Jul. 11, 2000

[54] POWER SUPPLY APPARATUS

[75] Inventor: Nakagawa Shin, Kiyose, Japan

[73] Assignee: Fidelix Y.K., Tokyo, Japan

[21] Appl. No.: 09/181,185

[22] Filed: Oct. 28, 1998

[30]     Foreign Application Priority Data

| Mar. 10, 1998 | [JP] | Japan | .................................. | 10-078294 |
| Apr. 27, 1998 | [JP] | Japan | .................................. | 10-131024 |
| Jul. 27, 1998 | [JP] | Japan | .................................. | 10-225187 |
| Sep. 25, 1998 | [JP] | Japan | .................................. | 10-271949 |

[51] Int. Cl.[7] ............................ H02M 3/335; H02M 3/24
[52] U.S. Cl. ............................................... 363/21; 363/97
[58] Field of Search .................................. 363/16, 20, 21, 363/95, 97, 131

[56]     References Cited

U.S. PATENT DOCUMENTS

| 5,063,489 | 11/1991 | Inaba ......................................... | 363/21 |
| 5,325,282 | 6/1994 | Bansard ..................................... | 363/21 |
| 5,675,480 | 10/1997 | Stanford .................................... | 363/21 |
| 5,859,768 | 1/1999 | Hall et al. ................................. | 363/21 |
| 5,892,672 | 4/1999 | Preller ....................................... | 363/97 |

FOREIGN PATENT DOCUMENTS

8-130871   5/1996   Japan .

*Primary Examiner*—Matthew Nguyen
*Attorney, Agent, or Firm*—Friedman Siegelbaum LLP

[57]     ABSTRACT

A power supply apparatus includes a switching element for relaying electrical current to be supplied to a transformer and a controlling circuit for controlling an operation of said switching element. The controlling circuit has a first oscillator which works to continuously drive the switching element and a second oscillator which works to intermittently operate the switching element. An amount of electrical current to be supplied to the transformer is controlled by changing a duty cycle or an oscillating period of the second oscillator in accordance with a variation of the amount of load current. Further, an initiating resistance for initiating the controlling circuit and a "cut-off" circuit cutting the resistance off: it is arranged such that the resistance is "cut-off" from the controlling circuit after initiating the controlling circuit in order to avoid that a significant amount of current is consumed at the resistance after initiating the circuit.

6 Claims, 7 Drawing Sheets

POWER SUPPLY APPARATUS

BACKGROUND OF THE INVENTION

1) Field of the Invention

The present invention relates to a power supply apparatus, and particularly, relates to apparatuses where electrical power consumption can be greatly reduced. The power supply apparatus according to the invention can be suitably applied to any electrical appliance having a remote controlling system, such as television equipment, video equipment, audio equipment and air conditioning systems; or electrical appliances, which should keep them in their standby mode even when the main functions of the appliance are not being used, such as telephone equipment, facsimile equipment and personal computers.

2) Related Arts

A remote controlling system is used in many kinds of electrical appliances, due to its convenience. Recently, such appliances are so designed that a main switch for turning on or off the main unit of these appliances is omitted and thus the appliances always keep their standby mode for receiving an on/off signal from the remote controller during the period when the main unit is not being used. Further, in some of these appliances, the main switch is omitted but a small sub-switch is equipped to switch the function mode between a standby mode and a driving mode. Appliances having a remote controlling system are always in a standby mode in order to watch and wait for a remote control signal; and the appliances having a sub-switch are also always in a standby mode so that it makes it possible to put the appliance in a driving mode each time even if the main unit of the appliance is not working. Therefore, these appliances always consume some electrical power when waiting for a signal even when the main units of the appliances do not work.

Telecommunication appliances, such as telephone equipment and facsimile equipment, should always keep themselves in a standby condition for telecommunication signals. Therefore, in order to keep the standby function, a certain amount of electrical power is always being consumed in these appliances.

The following four electrically conductive conditions are evidenced in an electrical appliance having a remote controlling function or a signal standby function.

(1) Complete off condition, which means a plug for connecting the appliance to the commercial AC power source is pulled off:

(2) The plug is still connected to the commercial AC power supply, i.e. inserted into the power socket, but the main switch of the appliance is switched off:

(3) The appliance is in a standby condition for a remote control signal or a telecommunication signal:

(4) The appliance is in a driving condition, which means the main unit is working.

Under the condition (1) and (2), there is no problem because almost no current goes through the appliance, but under the condition (3), the amount of current, which is consumed in the standby condition for the remote control signal or the telecommunication signal, is not as small as we would expect. Because, the power supply apparatuses for use in electrical appliances are generally constructed such that only the main circuits provided in the secondary side of the transformer are switched OFF while keeping the circuits in the primary side of the transformer ON during the standby condition, so that some electrical current is always consumed at the primary inductance of the transformer and then so-called copper loss, which is Joule heat of the coil, and so-called iron loss, which is generated by eddy current in the magnetic cores, are generated. In the case, particularly, that the power supply apparatus is arranged as a switching regulator, a switching loss caused by the operation of a switching element is generated in addition to the copper loss and the iron loss.

In the conventional power supply apparatus, it is not enough to pay efforts to reduce such an electrical power consumption when the appliance is in the standby condition, but more effort is being paid to decrease the manufacturing cost for the appliances by making the circuit construction simpler. However, nowadays, it should also be important to save energy from a point of view of the environment of our earth, thus it is becoming an important matter to save the consumption of the electrical power which is wasted when the appliances are in a standby condition.

An electrical power supply apparatus where the above problem is solved has been disclosed, for instance, in Japanese Preliminarily Patent Publication No. HEI 8-130871. The apparatus disclosed in this publication is designed; when the main unit of the appliance is in a standby mode, a switching element is controlled so as to be operated intermittently in accordance with a standby signal in order to decrease the electrical current consumption when the main unit is in a standby mode.

Particularly, in the AC-DC converter which uses a commercial AC supply, the input voltage is about 100V in Japan, and after rectifying the voltage becomes about 140V. In this case, since only a small amount of voltage of about 10V, which is used for driving the control circuit for controlling the switching element is taken from such a high input voltage, an initiating resister having a large initiating resistance required to initiate the control circuit. Therefore, in the AC-DC converter, a significant amount of power is consumed by the initiating resistance, so that a sufficient effect for decreasing the power consumption cannot be obtained only by making the operation of the switching element intermittent.

Second, in the apparatus disclosed in the above-mentioned publication, when the operation of the switching element is conducted intermittently, the switching frequency comes down to about several kHz so that a discordant sound is generated from the transformer. Therefore, such an apparatus would have a problem if it is applied to the appliances for private demands, such as television equipment, video equipment, etc. In addition, in this apparatus, the operation of the switching operation is changed into the intermittent mode in response to a stand-by signal sent from the main unit. That is to say, the change is not done automatically.

Apparent from the apparatus disclosed in the above-mentioned publication, there is a conventional switching regulator using an RCC (Ringing Choke Converter) or in a certain kind of DC-DC converter, where the switching operation of the switching element naturally becomes intermittently when the load thereof becomes extremely small, depending on the design or adjustment of the circuit. In such a converter, the switching frequency comes down to several kHz when the switching operation becomes intermittently, so that a discordant sound is also generated from the transformer. Further, there is another problem that the "ripple" becomes great when the switching frequency comes down. In order to avoid these problems, in the conventional switching regulator using an RCC, or the conventional DC-DC converter, a bleeder resistance is generally provided to prevent the operation of the switching element from becoming intermittent. Therefore, in such an apparatus, much more electrical current is consumed by the bleeder resistance in addition to the certain amount of the electrical power wasted when the main unit is in a standby condition.

SUMMARY OF THE INVENTION

In order to solve the above-mentioned problem, the first invention of the present application provides a power supply apparatus comprising a switching means for relaying an electrical current to be supplied into a transformer and a controlling means for controlling an operation of said switching means, said controlling means comprises a first oscillating means for continuously operating said switching means and a second oscillating means for intermittently operating said switching means, wherein the operating condition of the switching means is controlled by varying a duty cycle or an oscillating period of said second oscillating means in accordance with an amount of load current.

In this manner, since the second oscillating means is provided for intermittently driving the switching means exclusively, in the power supply apparatus of the first invention, it becomes more easier to control the operation of the switching means, so that the switching means operates with a frequency at which the above-mentioned problems of discordant sound or ripple do not occur. Additionally, since the amount of current supply to be supplied to the transformer is controlled in accordance with the variation of the load current, the power consumption during when the appliance is being in a stand-by condition can be reduced.

A power supply apparatus directed from the second invention comprises a switching means for relaying an electrical current to be supplied to a transformer, and a DSP (Digital Signal Processor) means for controlling an operation of said switching means; wherein said DSP selects or computes a pulse pattern for driving the switching means in accordance with an amount of load current, and said switching means is driven in accordance with the selected or computed pulse pattern.

By arranging so that the operation of the switching means is controlled by using a DSP, it becomes easier to determine a frequency for intermittently oscillating at whereby the problems of discordant sounds or large ripples are not generated.

It is preferred that the apparatus comprises a "dither" component generating means so that the "dither" component is added to an output of the DSP in order to improve the non-continuity of signals which occurs when an analog signal is converted into a digital signal.

In the power supply apparatus directed from the first or the second invention, it is preferred to provide a capacitor in an upper stream side of the controlling means and the controlling means is driven by an electrical current going through the reactance component of the capacitor.

That is to say, in this apparatus a capacitor is provided instead of an initiating resistance for initiating the controlling circuit of the switching element and the controlling circuit is driven by the electrical current going through the reactance component of the capacitor, so that the energy loss generated at the initiating resistance can be reduced.

Alternatively, it may be possible to arrange such that an initiating resistance for initiating the controlling means and a cutting-off means for being capable of cutting the initiating resistance off after the circuit has been initialized.

Further, it is preferred to arrange such that the power supply apparatus having a DSP means comprises a remote control signal receiving means, so that a remote control signal received by the remote control signal receiving means is analyzed by an IC which is provided in the DSP. Such an arrangement makes the construction of the apparatus similar and therefore the manufacturing cost of the apparatus can be reduced.

A power supply apparatus where direct current is taken out from an alternate current supply, which is directed from the third invention of the present application has a construction such that at least one capacitor for preventing noise and choke coils are located on the DC output side of a diode element for rectifying an electrical current supplied from said alternative current supply.

According to such a construction, it becomes unnecessary to provide a resistance for discharging in parallel to a capacitor, as is arranged in a line side of the rectifying diode in conventional power supply apparatuses in order to avoid to generate noise; therefore, the energy loss generated at the resistance can be reduced.

A power supply apparatus directed from the fourth invention comprises a switching means for relaying electrical current into a transformer and an analogue type controlling means for driving said switching means continuously or intermittently, wherein the apparatus comprises a resistance for initiating the controlling means and a cut-off means for being capable of cutting the initiating resistance off from said analogue type controlling means.

According to the fourth invention, an analogue type controlling circuit is provided by which the operation of the switching means is controlled continuously or intermittently in accordance with a load current; that is to say, when the load current consumed in the power supply apparatus is small and thus no continuous operation of the switching means is necessary, the switching means starts to be operated intermittently so that the power consumption at the transformer and the switching loss can be reduced. In addition to this, according to the fourth invention, the apparatus is so arranged that the initiating resistance is cut off after the apparatus is initiated, and thus the energy loss generated in the initiating resistance can be reduced.

It is preferred to arrange the apparatus directed from the fourth invention such that the controlling means comprises a detecting means for detecting a duty cycle of said switching means and the operation mode of the switching means is changed to an intermittent manner or a continuous manner in accordance with an output of the detecting means.

Further, it is preferred to detect the duty cycle of the switching means with the aid of a comparator circuit having a hysteresis characteristic or a comparator circuit having a time delay element.

As mentioned above, if the switching element operates intermittently, the switching frequency decreases to about several kHz and then problems of discordant sound or large ripple would occur. According to the fourth invention, the duty cycle is detected by the comparator circuit using a hysteresis characteristic or a time delay element. Then, when the thus detected duty cycle is lesser than a predetermined value, the operation of the switching means becomes intermittent to reduce the power consumption, when the appliance is in the stand-by condition. Additionally, it becomes possible to make the switching frequency lower (less than several hundreds Hz) so that the switching noise becomes non-audible to the human ear and the above-mentioned discordant sound problem can be solved.

The problem of the ripple can be solved by making the frequency of the intermittent switching operation not so low or making a capacitance of the capacitor on the output side.

DETAILED EXPLANATION OF THE PREFERRED EMBODIMENTS

Preferred embodiments according to the present invention will be explained below, referring to the attached drawings. It should be noted that the common numerical references are used for the common elements in each embodiment, and the explanation therefor is omitted from the embodiments after the second.

Figure 1:
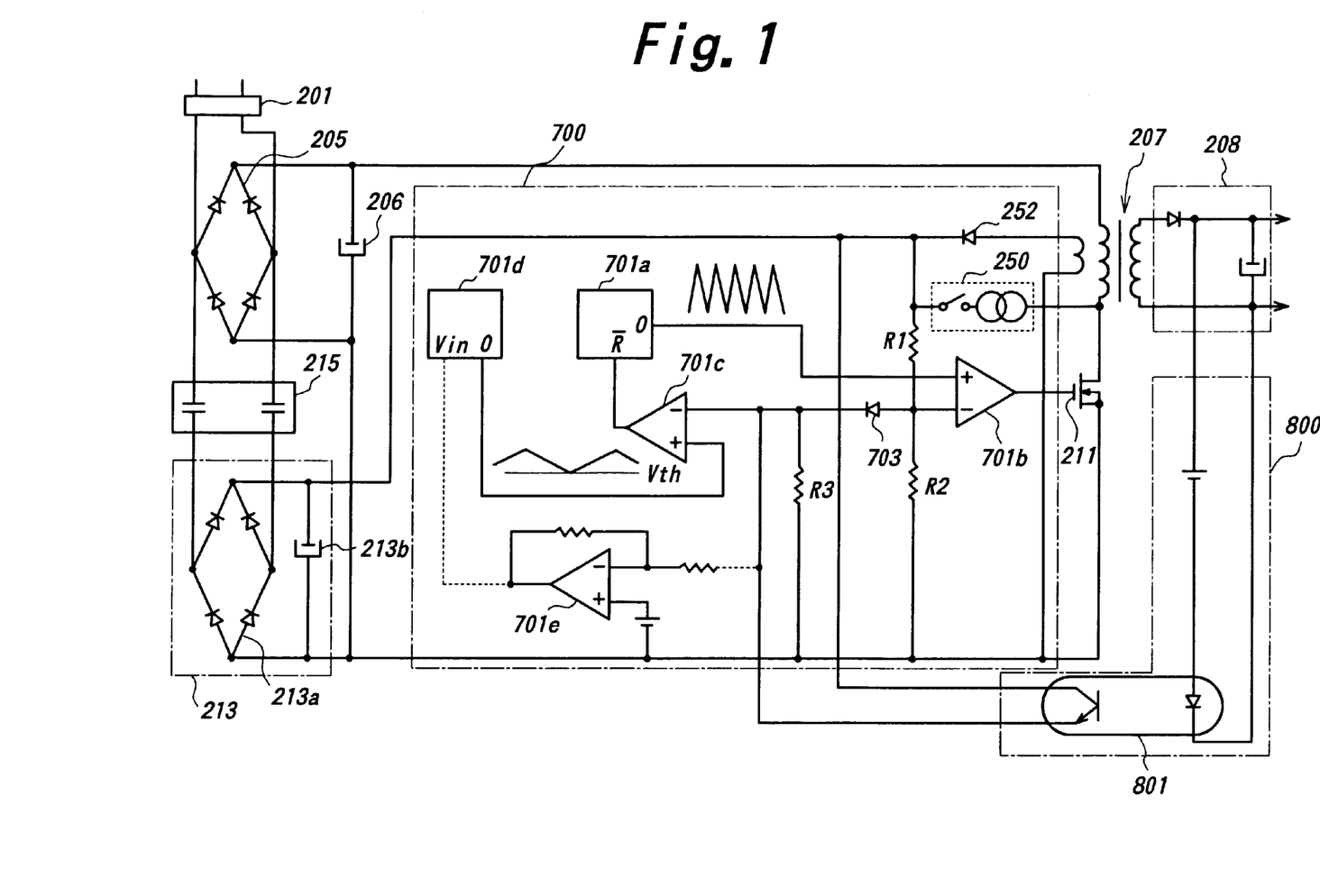
FIG. 1 is a block diagram showing a construction of a first embodiment of the present invention.

FIG. 1 is a circuit diagram showing a construction of the first embodiment, which is directed form the first invention of the present application.

The apparatus shown in FIG. 1 comprises a rectifying element 205 for rectifying an electrical current supplied from a commercial AC power supply 201, a capacitor 206 for storing the rectified electrical current, a transformer 207, a rectifying and smoothing circuit 208 for rectifying and smoothing an output of the transformer, a switching element 211 for relaying an electrical current to the transformer, a controlling circuit 700 for controlling a switching operation of the switching element 211, and a power supply circuit 213 for supplying power to the controlling circuit 700, a capacitor (reactance dropper) 215, and a load current detecting means 800.

The electrical current supplied from the commercial power supply 201 is rectified by the rectifying element 205, smoothed by the capacitor 206 and then supplied to the transformer 207. While, the electrical current is supplied to the power supply circuit 213, which is for controlling the controlling circuit 700. Under the control of the circuit 700, the switching element 211 is driven. The power supply circuit 213 comprises a capacitor 215 (reactance dropper) which is located between the rectifying diode 213a and the commercial power supply 210; and an electrical current going through the reactance component of the capacitor 215 is used for driving the controlling circuit 700. That is to say, the current going through the capacitance reactance is stored in the capacitor 213b via the diode 213a, which are provided as a power supply for the controlling circuit 700. Therefore, it is possible to prevent the energy loss, which should occurs if an initiating resistance is provided to drive the controlling circuit 700. It should be noted that capacitors having its capacitance of 0.01 μF can be suitably used for the capacitor 215.

The controlling circuit 700 comprises a first oscillator 701a, which is for continuously driving the switching element 211, a second oscillator 701d, which is for intermittently driving the switching element 211 in case that a load current becomes small, a first comparator 701b; and a second comparator 701b.

When the amount of load current which goes through the secondary side of the transformer 207 becomes large, the current going through a photo coupler 801 of the load current detecting means 800 becomes small, and then the voltage at the resistance R3 becomes low. When the voltage at the resistance R3 becomes less than a given value Vth, which is obtained by dividing the input voltage of the first comparator 701b by the resistance R1 and R2, the second comparator 701c becomes inoperative, then the first oscillator 701a is driven in a continuous oscillating mode to output pulses into the switching element 211 in a continuous manner. The amount of the electrical current supplied to the transformer 207 is determined by a duty cycle of the first comparator 701b. In response to the output of the first oscillator 701a (large), the switching element 211 is driven in a continuous manner so that an electrical current corresponding to the load current is supplied to the transformer 207.

On the other hand, when the amount of the load current becomes small and the voltage at the resistance R3 becomes greater than a predetermined voltage Vth, the second comparator 701c operates so that the output of the second oscillator 701d is supplied to a reversed reset terminal of the first oscillator 701a. In response to this, the first oscillator 701a begins to output pulse signals intermittently. That is to say, when the voltage at the resistance R3 becomes Vth or more, the first oscillator 701a operates to output pulse signal intermittently so that the amount of the electrical current to be supplied to the transformer 207 becomes small.

It should be noted that a diode 701f is provided between the resistance R3 and the resistance R1 and R2, which divides the input voltage at a minus terminal of the comparator 701b into two. Because of the existence of the diode 701f, the potential at the minus terminal of the first comparator 701b does not increase more than Vth. That is to say, even if the voltage at the resistance R3 becomes Vth or more, the duty cycle of the first comparator 701b does not go down, for instance, 20% or less. It means, if the load current becomes significantly small, the width of the pulse being supplied to the switching element 211 does not become smaller than a predetermined width, so that it is not necessary to increase the number of the switching operation and therefore the switching loss is not apt to be generated there.

The second oscillator 701d is settled to output triangle wave signal when the voltage at the resistance R3 is Vth or more. When the potential at the minus terminal of the comparator 701c becomes Vth or more, the first oscillator 701a starts to output pulse signal intermittently. Further, as the voltage at the resistance R3 increase, the duty cycle of the second comparator 701c decreases, and therefore, the intermittent oscillating period of the first oscillator 701a is determined by the duty cycle of the second oscillator 701d.

The operation of the second oscillator 701d corresponds to the amount of the load voltage detected by the load voltage detector 800. As a result, when the amount of the load current is small, the amount of electrical current supplied to the transformer 207 is reduced because the operation of the switching element 211 becomes intermittent; then the consumption of the electrical current is reduced when the appliance is in a stand-by mode.

Figure 2:
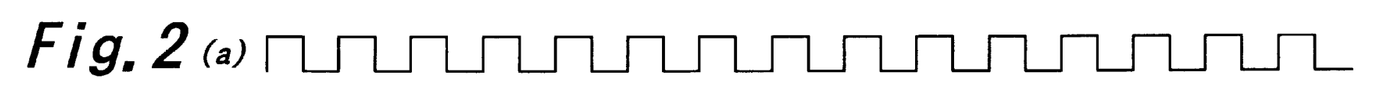
FIGS. 2(a) to 2(d) are schematic views depicting pulse patterns supplied into the switching means provided in the apparatus of the first embodiment.
FIGS. 2(e) and 2(f) are graphs for explaining the operation of the apparatus shown in FIG. 1.

FIGS. 2(*a*) to 2(*e*) are schematic views of driving waveshapes of the switching element 211 and graphs for explaining the operation of the apparatus shown in FIG. 1. FIGS. 2(*a*) and 2(*b*) show the driving waveshapes of the switching element in a continuous oscillating mode; FIGS. 2(*c*) and (*d*) illustrate the driving waveshapes of the swithcing element in an intermittent oscillating mode; FIG. 2(*e*) is a graph depicting a relationship among the duty cycle of the second comparator 701*c*, the load current Io and the driving waveshapes of the first oscillator 701*a*; and FIG. 2(*f*) is a graph representing a relationship among the duty cycle of the first compartor 701*b*, the load current Io and the driving waveshapes of the first oscillator 701*a*.

As shown in FIG. 2(*e*), when the load current Io is small, in other words, when the potential at the resistance R3 is more than Vth, the output of the second oscillator 701*d* is supplied to the first comparator 701*a* via the second comparator 701*c*; then the first oscillator 701*a* outputs signals intermittently. The intermittent oscillating period of the first oscillator 701*a* is determined by the duty cycle of the second comparator 701*c*. That is to say, as the load current Io increases, the duty cycle of the second comparator 701*c* increases so as to make the oscillating period short; on the other hand, when the load current increases so much that the voltage at the minus terminal of the second comparator 701*c* becomes lower than Vth, the duty cycle of the second comparator 701*c* becomes 100%. Then, the reset terminal of the first oscillator 701*a* does not operate any more and the first oscillator 701*a* begins to output signals in a continuous manner.

After the operating condition of the first oscillator changes to the continuous mode, as the load current Io increases, the duty cycle of the first comparator 701*b* becomes large as shown in FIG. 2(*f*). It means the width of the pulse supplied to the switching element 211 becomes wide so that the amount of current supply to the transformer 107 increases. As apparent from FIG. 2(*f*), the apparatus is settled so as not to make the duty cycle of the first comparator 701*d* down to 20% or less. Therefore, even if the amount of the load current becomes too great after the first oscillator 701*b* has started to output signals intermittently, the width of the pulses supplied to the switching means 211 does not become smaller than a predetermined width, so no switching loss is generated in the switching operation of the means 211.

In the first embodiment, it is arranged such that the oscillating frequency of the second oscillator 701*d* is fixed. However, as shown in FIG. 2 by a broken line, it may be possible to add a third comparotor 701*e* in order to operate the second oscillator 701*d* as a voltage controlled oscillator. In this case, when the load current is small, the oscillating frequency of the second oscillator 701*d* goes down.

Further, the apparatus of the first embodiment is arranged such that the controlling circuit 700 is driven by using a reactance dropper (the capacitor 215 and the bridge diode 213*a*). However, it may be possible to provide an initiating resistance and its cut off means 250 instead of the reactance dropper. In this case, after initiating the controlling circuit 700 the initiating resistance should be cut off from the circuit.

Figure 3:
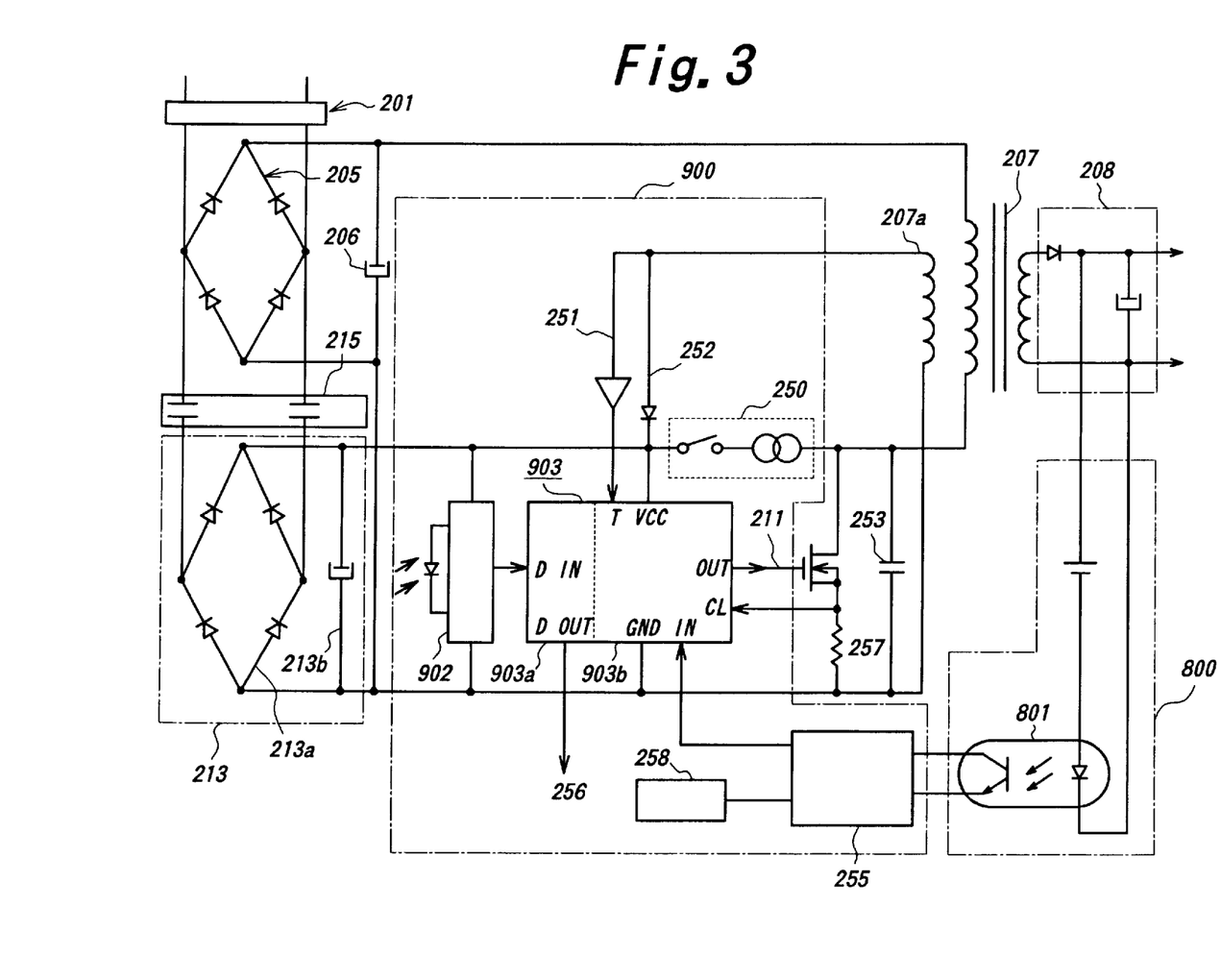
FIG. 3 is a block diagram illustrating a construction of a second embodiment of the present invention.

FIG. 3 is a block diagram depicting a power supply apparatus according to the second embodiment of the present invention. In the second embodiment, the operation of the switching element 211 is controlled by a DSP.

In the second embodiment, the controlling circuit 900 for driving the switching element 211 comprises a DSP 903. A plurality of pulse patterns for driving the switching element 211 are memorized in the DSP 903; the best pulse pattern, by which the above-discussed problems of discordant sound, power consumption in a stand-by mode, electromagnetic noise, etc. can be solved, is selected and outputted to the switching element 211 in accordance with the amount of load current which is detected by the load current detecting means 800.

Figure 4:
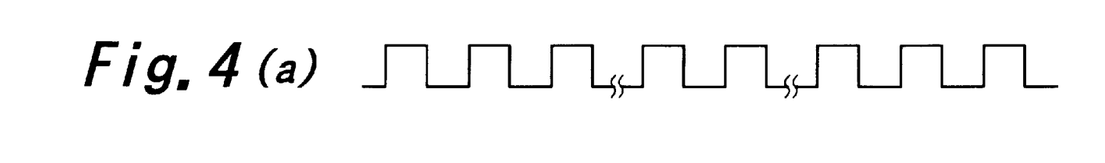
FIGS. 4(a) to 4(f) are schematic views representing pulse patterns which are supplied into the switching means in the apparatus of the second embodiment.

FIGS. 4(*a*) to 4(*e*) show examples of the pulse patterns memorized in the DSP 903. FIGS. 4(*a*) and 4(*b*) are the examples that should be selected when the amount of the load current is large. According to these patterns, the switching element 211 operates continuously. While, FIGS. 4(*c*) and 4(*d*) represent examples of the pulse patterns that should be selected when the amount of load current is comparatively small, by which the switching means 211 operates intermittently.

For instance, when the amount of the load current detected by the load current detecting circuit 800 is small, the DSP 903 selects an intermittent pulse pattern where only one pulse is generated with a predetermined frequency (FIG. 4(*f*)); then the DSP controls the pulse generating period C to make it shorter (FIG. 4(*e*)) as the amount of the load current increases. When the load current further increases, the DSP 903 changes its oscillating mode so that two continued pulses are generated with a predetermined frequency (FIG. 4(*d*)) in order to avoid the period C from becoming too short. In this manner, the DSP 903 controls the number of pulse, which generated continuously, as the load current increases (FIG. 4(*c*)). At a point that the load current exceeds over a predetermined value, the DSP 903 changes its operating mode so as to generate pulse signal continuously (FIGS. 4(*b*) and 4(*a*)). When the DSP 903 generates pulse signal continuously, the apparatus operates a general PWM inverter, PFM inverter or an RCC.

In the second embodiment, a plurality of pulse patterns are memorized in the DSP 903, but it may be possible to arrange such that an algorithm to calculate a suitable pulse pattern is set in the DSP 903 and the pulse pattern is generated in accordance with the algorithm as an occasion demands for changing the pulse pattern.

It should be noted that a dither generating circuit 258 is provided in the second embodiment. The circuit 258 supplies a high frequency noise component into an A/D converter 255, where the output of the photo coupler 801 is converted into digital signal, in order to improve the non-continuity of the signal.

Further, in the second embodiment, a resistance 257 is provided being parallel to the switching element 211 to detect if some exceed current exists. When some exceed current is detected here, DSP 903 stops to operate for a certain time in order to avoid a waste of current consumption.

Furthermore, a third coil 207*a* is provided with the transformer 207 as well as a capacitor 253, which causes a resonation. In this embodiment, so-called zero voltage switching operation is realized. That is to say, a comparator 251 detects the fact that the core of the transformer 207 has been reset and then an ON signal is sent to the switching element 211 with a delay of a certain time.

Moreover, in the second embodiment, a light receiving element 902 is provided for receiving a remote control signal; the DSP 903 is switched ON/OFF in response to the remote control signal, which comes from the outside. A microcomputer 903a for analyzing the remote control signal is provided in the DSP 903 in order to make the size of the apparatus compact and decrease the manufacturing cost therefor.

It may be possible to provide an initiating resistance and its cut off circuit 250 for initiating the controlling circuit 900 instead of the capacitor 215 and the diode 213a (reactance dropper). It should be noted that when the main equipment (not shown) is driven in a normal driving mode, the necessary electrical current for driving the controlling circuit 900 is supplied via the diode 252.

The apparatuses of the above mentioned embodiments are constructed as an AC/DC converter, however, these apparatuses can also be applied to DC/DC converters. Further, it may be possible to arrange the A/D converter 255, and/or DSP 903 and the microcomputer 903a in the secondary side of the transformer 207.

Figure 5A:
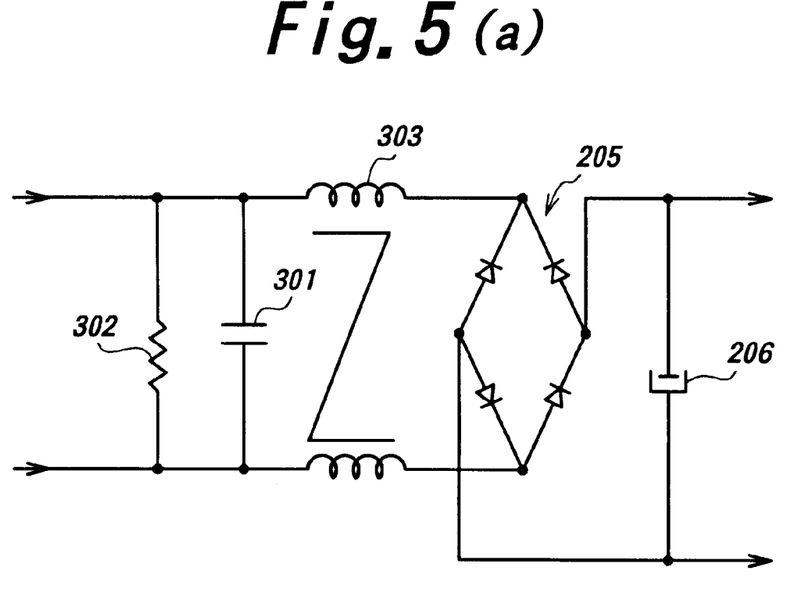
FIG. 5(a) is a block diagram illustrating a third embodiment of the power supply apparatus according to the present invention, where "a line across the line capacitor" is provided.
Figure 5B:
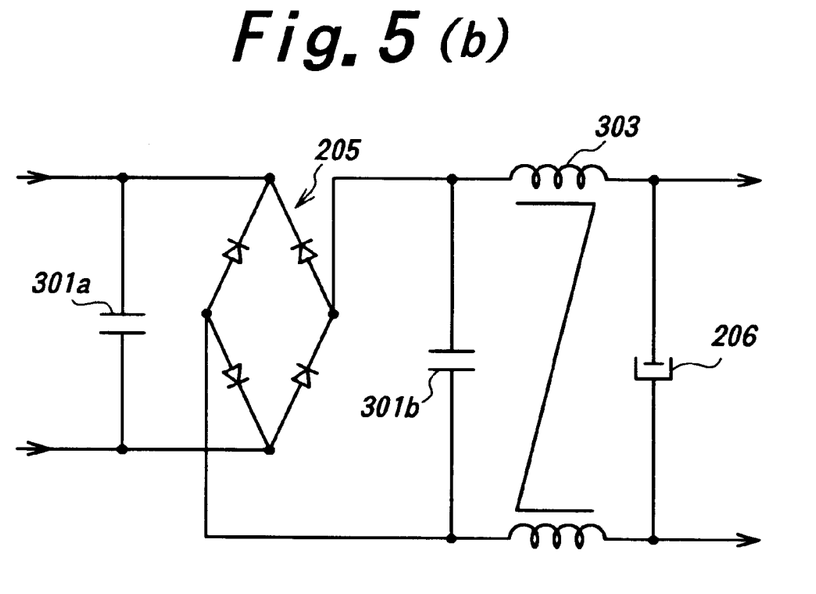
FIG. 5(b) is a block diagram representing a modification of the third embodiment of the power supply apparatus according to the present invention, where "a line across the line capacitor" is provided.

FIG. 5 is a block diagram partially illustrating a third embodiment of the power supply apparatus according to the present invention. In this embodiment, it is arranged so that an energy loss at "a line across the line capacitor" (hereinafter called as "X capacitor"), which is generally provided beside the rectifying diode 205, is prevented. According to the third embodiment, it is possible to further reduce the power consumption when the apparatus is in a standby mode. It should be noted that the commercial current supply 201 and the circuits on the lower stream side of the capacitor 206 are omitted in FIG. 5.

As shown in FIG. 5(a), in the power supply apparatus, an X capacitor 301 and common mode choke coils 303 are generally provided on the line side of the rectifying circuit 205 in order to reduce noise generated from circuits provided after the rectifying means. In addition to the noise from the circuits, the diode 205 itself also generate noise at the time of recovery, so it is necessary to avoid the noise from the diode. Further, in order to satisfy the standard for preventing noise generation, the X capacitor often has to have its capacitance of 0.1 μF or more. If a capacitor having its capacitance of 0.1 μF or more is used for the X capacitor, it becomes necessary to have a resistance 302 for use in discharge in accordance with the safety standard, and thus a great amount of electrical current loss is generated there.

In the third embodiment, the X capacitor 301 is divided into two, and these two capacitors 301a and 301b are arranged on both sides of the rectifying diode 205, and the common mode choke coils 303 are provided on the output side of the rectifying diode 205. Further, in this embodiment, an arrangement is made such that the capacitor 301a provided on the line side of the diode 205 has its capacitance of 0.1 μF or less. According to this construction, there is no limitation of the capacitance of the capacitor 301b provided on the DC output side of the rectifying diode 205. Therefore, if a capacitor having a large capacitance is provided on the DC output side, not only a preferred noise characteristic can be obtained but also the resistance (302) for discharge becomes unnecessary.

It is preferred to use a diode having a high recovery characteristic, which does not generate so much noise, for the rectifying diode 205. However, even using a bridge diode having a low recovery characteristic, it is possible to obtain a good noise characteristic if a capacitor is provided beside each diode constituting of the bridge diode in a parallel manner. In this case, the capacitor 301a provided on the line side can be omitted, depending on the condition.

By the arrangement of the capacitor for preventing noise and the common mode choke coils in this manner, even if the capacitor on the line side has its capacitance of 0.1 μF or more, the energy loss generated at the resistance for discharging can be reduced so much.

It should be noted that two normal choke coils are able to be substituted for the common mode choke coils 303 and that it may be possible to arrange a multi-step construction of the X capacitor 301b and the choke coils 303.

According to experiments by the inventor, it is possible to realize a power supply apparatus where the power consumption when the appliance is in the stand-by mode is reduced to about 20 mW by an involved effect of the techniques that the switching element is driven intermittently, that the energy loss generated at the initiating resistance is reduced (by the reactance dropper or the initiating resistance cut off circuit 250), and that the energy loss generated at the resistance for discharging (303) is reduced by arranging the X capacitor and the choke coils on the output side of the rectifying diode.

In the case that the reactance dropper (251 and 213a) is provided, if a fuse resistance is directly connected to the capacitor 215, a cheap and small capacitor, which does not satisfy the standard of safety, can be used without causing any trouble.

Figure 6:
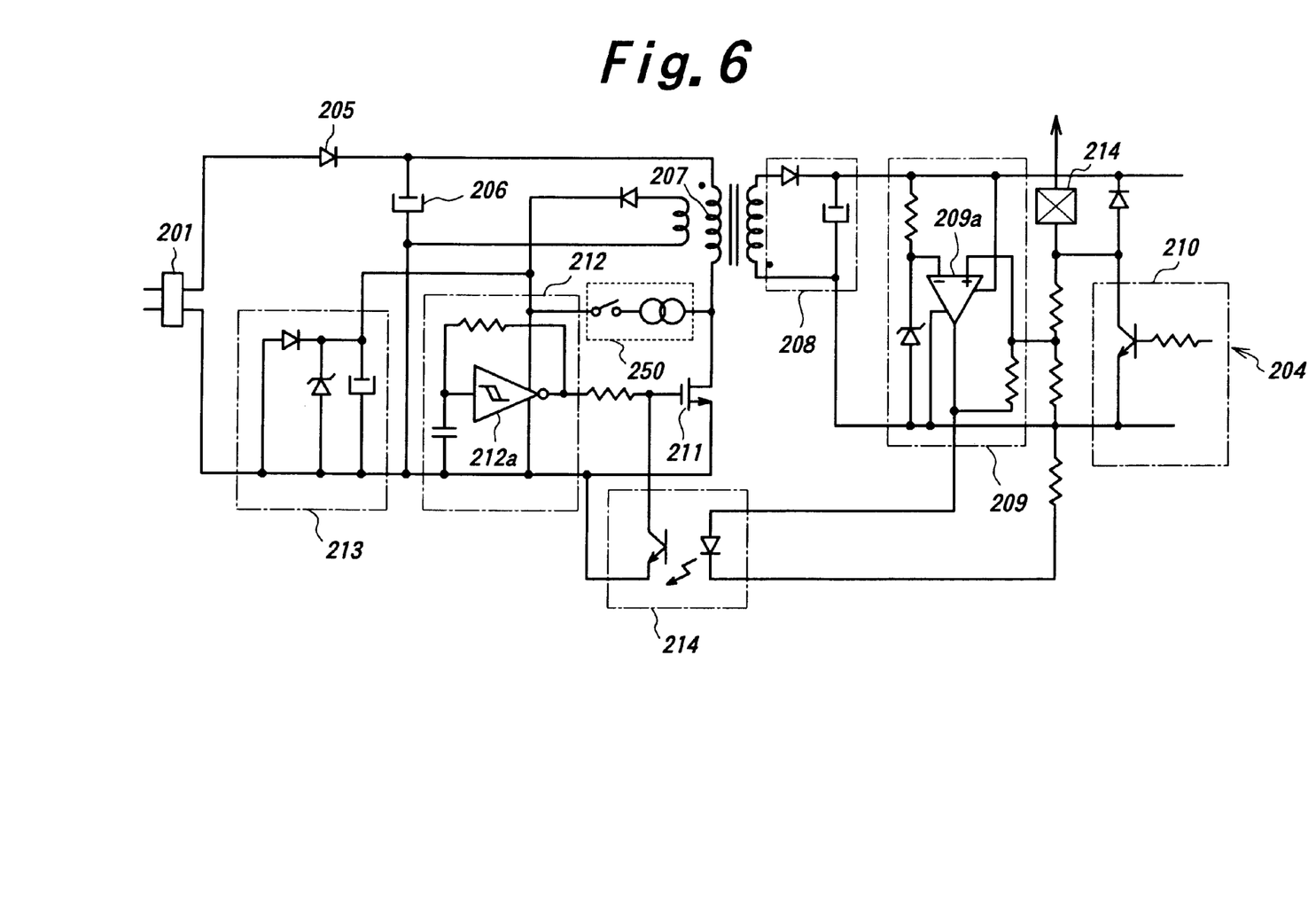
FIG. 6 is a block circuit diagram depicting a construction of a fourth embodiment of the present invention.

FIG. 6 is a circuit diagram showing a construction of a power supply apparatus according to the fourth embodiment of the present invention. The apparatus of this embodiment is designed as an auxiliary power supply apparatus of an electrical appliance having a remote control signal receiving circuit 210 where the main unit is made on or off in response to the remote control signal. The apparatus is constructed such that when a signal 204 is sent to the remote control signal receiving circuit 210 from the outside, the output of the commercial power supply 201 is change so as to directly supply power to the main unit (not shown).

The auxiliary power supply apparatus in the fourth embodiment comprises a rectifying element 205 for rectifying an alternating current supplied from the commercial AC power supply 201, a capacitor 206 for storing the thus rectified current, a transformer 207, a rectifying and smoothing circuit 208 for rectifying and smoothing an output of the transformer 207, a load current detecting circuit 209 for detecting a load current of the auxiliary power supply apparatus itself, a remote control signal receiving circuit 210 for receiving a remote control signal 204 coming from the outside, a switching element 211 for intermitting the current supply to the transformer 207, an oscillator circuit 212 for operating the switching element 211, a control power supply 213 for controlling the oscillator circuit 212, an initiating resistance and a switch for cutting off the resistance 250, and a photo coupler 214 for performing a gate operation for the oscillator circuit 212 in response to an output of the load current detecting means 209.

The electrical current supplied from the commercial AC power supply 201 is stored in the capacitor 206 after being rectified by the diode 205, and then supplied to a primary coil of the transformer 207 via the switching element 211, while, the electrical current from the AC power supply 201 is supplied to the control power supply 213 for controlling the oscillator circuit 212. The oscillator 212a using a Schmitt trigger inverter is operated by an electrical power supplied from the AC power supply 213 to drive a MOSFET 211 which is provided as a switching element of the switching regulator.

In this embodiment, the load current detecting circuit 209 comprises a Schmitt trigger circuit 209a and an output thereof is given to the photo coupler 214. When an input voltage of the plus terminal of the Schmitt trigger circuit 209a becomes higher than a given threshold voltage, the photo coupler 214 is lit and then the pulse signal is stopped to be supplied from the oscillator 212a to the MOSFET 211. When the switching operation of MOSFET 211 is stopped no electrical current is supplied to the transformer 207. Then, the input voltage of the Schmitt trigger circuit 209a becomes lower than the threshold voltage, and thus the photo coupler 214 is lit off, so that the oscillator circuit 212 starts to supply pulse signals to the MOSFET 211 again. Since such a feedback loop is formed, the output voltage of the auxiliary power supply apparatus is always managed so as not to exceed a predetermined range. Therefore, the current supply to the transformer 207 is conducted intermittently in accordance with the management of the output voltage of the apparatus, so that the electrical current consumption there can be significantly reduced.

In the third embodiment, there is provided an initiating resistance cut off means 250. After initiating the oscillator 212, the initiating resistance is cut off from the circuit in order to reduce the current consumption at the initiating resistance.

In this embodiment, the output voltage of the auxiliary power supply apparatus is controlled by a comparator having a hysteresis characteristic, however, a combination of a comparator and a one shot multi-vibrator or a combination of a comparator and a time constant circuit can be used therefor. In such combinations, it becomes to be apt not to be influenced by a discordant noise which is generated in the transformer at the vicinity of the threshold voltage. Further, in this embodiment, the coil type transformer is used, but the present invention can also be applied to a piezoelectrical type transformer. In general type of switching regulators, the switching frequency of the switching element 211 is over 10 kHz, however, according to the invention, intermittent electrical current supply is supplied to the transformer with a slow interval, i.e. several hundreds Hz or less.

Figure 7:
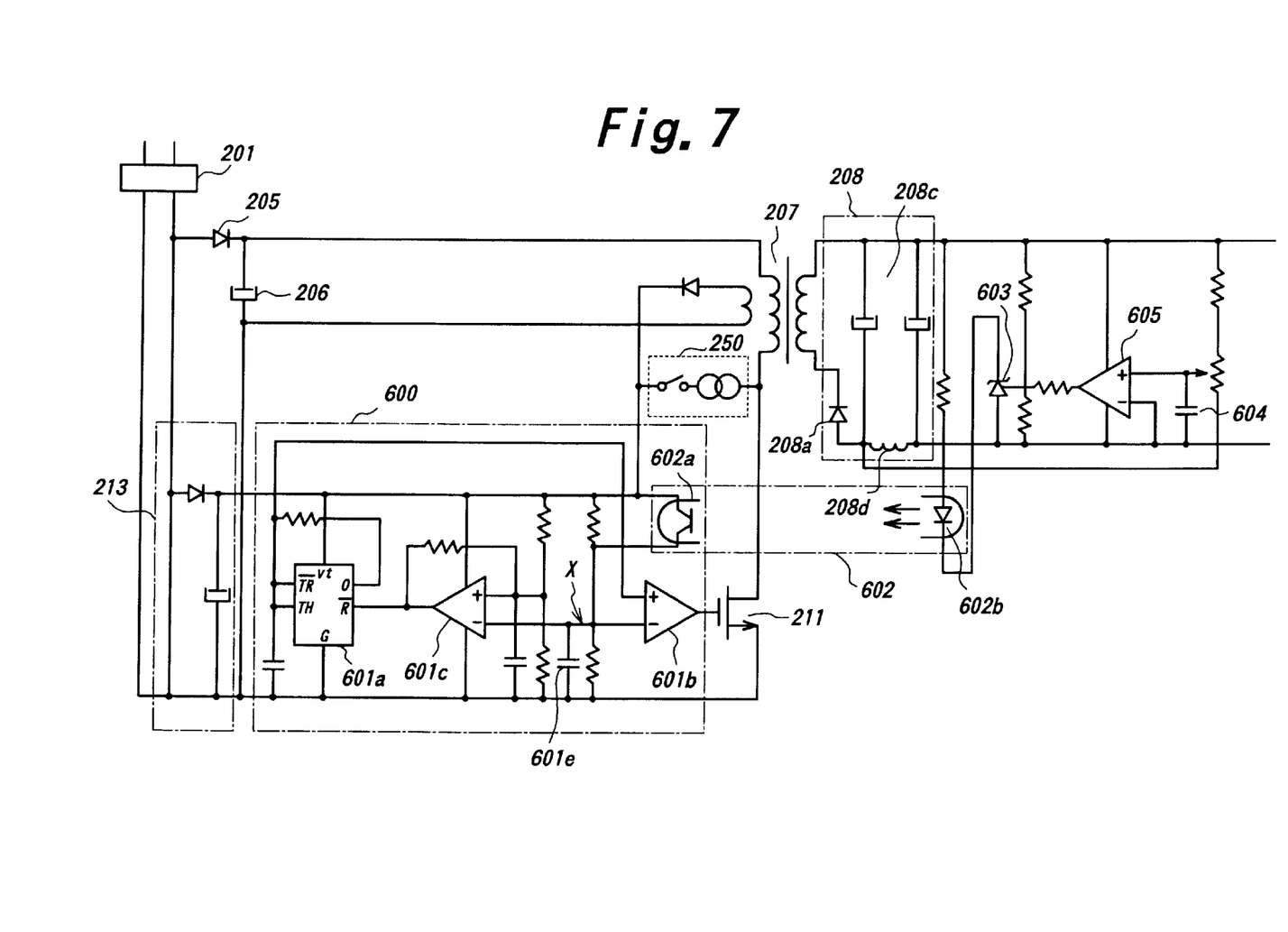
FIG. 7 is a block circuit diagram illustrating a construction of a fifth embodiment of the present invention.

FIG. 7 is a circuit diagram depicting a construction of the power supply apparatus according to the sixth embodiment of the present invention. The invention is applied to a switching regulator in this embodiment. When the load current of the power supply apparatus is 20 to 100% of the peak current, the switching element 211 is continuously driven to supply electrical current to the transformer 207, while, when the load current is 20% or less of the peak current, the switching element 211 operates intermittently, so that it can be prevented that an unnecessary power is consumed when the load of the apparatus is small, for instance, when the main unit is in a standby mode. In the sixth embodiment, a duty cycle of the switching element 211 is detected, and the operation of the switching element 211 is controlled in accordance with the detected duty cycle in order to reduce an energy loss as explained below.

As depicted in FIG. 7, there is provided a controlling circuit 601 for controlling the switching element 211 which is arranged on the electrical current supply line from the commercial AC power supply 201 to the transformer 207. The output of the power supply 201 is supplied to the transformer 207, while supplied to an auxiliary power supply 213 for driving the control circuit 601 via a capacitor 215. The control circuit 601 comprises an oscillator 601a and first and second comparators 601b and 601c. The oscillator 601a generates pseudotriangle waves; and the triangle wave is supplied to a plus terminal of the first comparator 601b. To the minus terminal of the first comparator 601b, is supplied a voltage generated at both ends of the capacitor 213b in a voltage divided manner. The voltage is compared to the output of the oscillator 601a to drive the switching element 211. According to the construction, the apparatus is set up such that when the photo coupler 602, which will be explained below, is switched off and the transistor 602a is nonconductive, the duty cycle of the switching element 211 becomes 50%, while when the photo coupler 602 is switched on and the transistor 602a is conductive, the duty cycle becomes 0%.

On the other hand, there is provided a rectifying smoothing circuit 208 composed of a diode 208a and a pi ($\pi$) type filter 208c on the secondary side of the transformer 207. On the downstream of the filter 208c, is arranged a standard voltage element 603 in parallel to the filter 208c, and an LED 602b is provided on the output line of the standard voltage element 603. The LED 602b and the transistor 602a constitute a photo coupler 602; the LED 602b is arranged to be parallel to the resistance 601d and the transistor 602a is used for dividing an input voltage to the first comparator 601b on the primary side of the transformer 207.

When the switching element 211 operates in response to the oscillator 601a to supply a pulse current to the transformer 207, the output of the secondary side of the transformer 207 is given to the standard voltage element 603. When the output is higher than the standard voltage of the element 603, a great amount of current goes through the element 603 to make the LED 602b of the photo coupler 602 bright, so that the current going through the transistor 602a is increased to make the potential at a point X high. The potential at the minus terminal of the first comparator 601b thereby becomes high, then the duty cycle of the first comparator 601b decreases. Therefore, the interval for the condition ON of the switching element 211 becomes short so that the amount of current supplied to the transformer 207 becomes small. As a result, the voltage at the secondary side of the transformer 207 decreases so that the standard voltage element 603 becomes non-conductive. In this manner, a control loop is formed that the photo coupler 602 becomes dark, the potential at the point X decreases, and then the duty cycle of the first comparator 601b increases.

While, to the minus terminal of the second comparator 601c, is given the voltage at the point X, and to the plus terminal thereof, is provided a voltage at the time when the duty cycle of the first comparator 601b decreases to 10% or less as a standard voltage. Therefore, when the potential at the point X increases to make the duty cycle of the first comparator 601b down to 10% or less, the second comparator 601c starts to output a signal. The output terminal of the second comparator 601c is connected to a reset terminal of the oscillator 601a; the oscillator 601a stops to generate the triangle wave in response to the output of the second comparator 601c. After stopped to generate the triangle wave, the electrical current consumption at the secondary side of the transformer 207 increases little by little and the output voltage of the secondary side of the transformer 207 becomes smaller than a predetermined value; then the LED602b of the photo coupler 602 becomes dark and the amount of the current going through the transistor 602a becomes small. Therefore, the voltage at the minus terminal of the second comparator 601c goes down to make the output of the comparator 601c high, so that the reset condition of the oscillator 601a is released and then the oscillator 601a starts to generate the triangle wave again. The intermittent switching operation of the switching element 211 is conducted by repeating the above-mentioned operation. In the sixth embodiment, the duty cycle of the first comparator 601*b*, in other words, the duty cycle of the switching element 211, is detected in this manner; when the duty cycle becomes lesser than a predetermined value, the generation of the triangle wave signal by the oscillator 601*a* is stopped. During the period when the generation of the triangle wave signal is stopped, the switching operation of the element 211 is not conducted and thus the energy loss caused by unnecessary switching operation can be reduced.

In the fourth embodiment, there are also provided an initiating resistance for initiating the oscillating circuit 600 and an initiating resistance cut off means 250. After initiating the oscillating circuit 600, the initiating resistance is cut off from the circuit in order to reduce the current consumption at the initiating resistance.

It should be noted that a positive feedback is applied to the second comparator 601*c* in order to make the frequency of the switching operation low when the switching operation is conducted intermittently, so that discordant cannot be heard by human ear. Further, a capacitor 601*e* provided between the point X and the ground works for the same purpose.

In the sixth embodiment, to stop the oscillation in the oscillator 601*a*, in other words, to switch the condition that the power is supplied to the transformer 207 continuously or intermittently, is not conducted by the load detected at the secondary side of the transformer 207, but conductive automatically in responding to the duty cycle of the switching element 211. Such a condition can be substantially achieved only by adding the second comparator 601*c*. It means the energy loss caused by the switching operation of the switching element 211 during the standby mode can be reduced with a simple circuit construction.

In order to judge the timing when the operation of the switching means should be changed by detecting the electrical current consumption in the power supply apparatus, it is necessary to provide a resistance for detecting the change of the current, and some energy is lost at the resistance. Further, in order to judge the timing by using a hysteresis voltage, some ripple would be generated. Furthermore, if providing a ripple filter in order to remove the ripple, some energy would be lost at the ripple filter. Contrary to those, in the sixth embodiment of the present invention, a "dead zone" is provided in the duty cycle of the first comparator 601*b* and the current supply is stopped when the duty cycle becomes into the "dead zone". Therefore, it is unnecessary to provide a resistance for detecting the consumed current. Therefore, the energy loss generated by them can be totally prevented.

In the sixth embodiment, it is arranged such that the switching frequency of the switching element 211 is fixed but only the duty cycle thereof is varied (both the on time and off time are varied). However, the other circuit constructions may be taken such that the on time of the switching element is fixed but the switching frequency and the off time of the switching element are varied, or that the off time of the switching element is fixed, but the switching frequency and the on time of the switching element are varied. In any case, it can be considered that the duty cycle is varied in equivalent. Therefore, the term of duty cycle here is used in an equivalent meaning and thus includes all situations mentioned above.

Furthermore, in the sixth embodiment, the invention is applied to a "flyback" type power supply apparatus which has only one switching element, bit in the power supply apparatus which has a plurality of switching elements, or in a resonant type power supply apparatus or in a partial resonant type power supply apparatus, it is difficult to signify the duty cycle of the switching element apparently. However, from the point of view of energy, it is possible to take the duty cycle of the switching element(s) in all kinds of the power supply apparatuses into consideration. Therefore, the present invention can be applied not only to the apparatus which has one switching element but also to all of the other types of apparatuses mentioned above.

In the apparatus according to the sixth embodiment, the power consumption is further reduced by the construction that the current consumption at the secondary side of the transformer 207 is detected and the output voltage at the secondary side of the transformer is limited when the amount of the detected electrical current is small. That is to say, an output of the inductor 208*d* of the pi ($\pi$) type filter 208*c* is supplied to an additional comparator 605; the gate of the standard voltage element 603 is driven by the output of the comparator 605 to change the divided voltage ratio with respect to the standard voltage element 603. In other words, when the amount of the current consumption at the secondary side is small, the divided voltage ratio to the standard voltage element 603 is so changed that the output voltage of the secondary side is limited to be under a predetermined voltage and thus the power consumption in the power supply apparatus is further reduced. In order to detect an electrical current, a resistance is generally used. However, in this embodiment, a direct current resistance component of the inductor 208*d* of the pi ($\pi$) type filter 208*c* is used to detect the current consumed at the secondary side. Therefore, the current consumption can be reduced more in comparison to the case that a resistance is used to detect the current. It should be noted that the high frequency component contained in the inductor 208*d* is cut off by a low pass filter 604.

What is claimed is:

1. A power supply apparatus comprising: a switching means for relaying electrical current to be supplied to a transformer and a digital signal processor (DSP) means for controlling an operation of said switching means, wherein said DSP means memorizes a plurality of pulse patterns for controlling an operation of said switching means continuously or intermittently and wherein said DSP selects a suitable pulse pattern for driving said switching means from the memorized patterns in accordance with an amount of load current and wherein the switching means is driven in accordance with the thus selected pulse pattern.

2. A power supply apparatus according to claim 1, wherein said apparatus comprise a dither component generating means so that the dither component is added to an output of said DSP means.

3. A power supply apparatus according to anyone of claims 1, wherein a capacitor is given to said controlling means and wherein said controlling means is driven by electrical current which goes through a reactance component of said capacitor.

4. A power supply apparatus according to anyone of claims 1, wherein an initiating resistance for initiating said controlling means and a cutting off means for being capable of cutting the initiating resistance off after initiating the controlling means.

5. A power supply apparatus according to anyone of claim 1, wherein a remote control signal receiving means is provided and a remote control signal received by said remote control signal receiving means is analyzed by an IC which is provided in the DSP.

6. A power supply apparatus comprising: a switching means for relaying electrical current to be supplied to a transformer and a digital signal processor (DSP) means for controlling an operation of said switching means, wherein said DSP means previously memorizes an algorithm for computing a suitable pulse pattern for driving said switching means continuously or intermittently, and wherein said DSP computes the suitable pulse pattern for driving said switching means using the memorized algorithm in accordance with an amount of load current and wherein the switching means is driven in accordance with the thus computed pulse pattern.

* * * * *